United States Patent
Poremski et al.

(10) Patent No.: US 12,345,338 B2
(45) Date of Patent: Jul. 1, 2025

(54) VALVE SEAT INSTALLATION TOOL SYSTEM

(71) Applicant: Kennametal Inc., Latrobe, PA (US)

(72) Inventors: Jacob Poremski, Apollo, PA (US); Adam Tomon, Houston, TX (US)

(73) Assignee: KENNAMETAL INC., Latrobe, PA (US)

( * ) Notice: Subject to any disclaimer, the term of this patent is extended or adjusted under 35 U.S.C. 154(b) by 301 days.

(21) Appl. No.: 17/884,390

(22) Filed: Aug. 9, 2022

(65) Prior Publication Data
US 2024/0052932 A1 Feb. 15, 2024

(51) Int. Cl.
| | | |
|---|---|---|
| *B25B 27/06* | (2006.01) | |
| *B25B 27/24* | (2006.01) | |
| *F04B 1/0452* | (2020.01) | |
| *F04B 53/10* | (2006.01) | |
| *F16K 1/42* | (2006.01) | |
| *F16K 1/38* | (2006.01) | |
| *F16K 15/06* | (2006.01) | |

(52) U.S. Cl.
CPC ............. *F16K 1/42* (2013.01); *B25B 27/062* (2013.01); *B25B 27/24* (2013.01); *F04B 1/0452* (2013.01); *F04B 53/10* (2013.01); *F16K 1/385* (2013.01); *F16K 15/06* (2013.01)

(58) Field of Classification Search
CPC . F16K 7/16; F16K 1/422; B25B 27/02; B25B 27/06; B25B 27/062; B25B 27/24; F04B 53/1087; Y10T 29/49407; Y10T 29/53596; Y10T 29/53878; Y10T 137/0486; Y10T 137/0491; Y10T 137/0497; Y10T 137/6065; Y10T 137/6086; Y10T 137/6109; Y10T 137/6113; Y10T 137/6154
See application file for complete search history.

(56) References Cited

U.S. PATENT DOCUMENTS

| | | | |
|---|---|---|---|
| 2,876,533 A | | 3/1959 | Oberley et al. |
| 4,520,842 A | * | 6/1985 | Elliott .................... F16K 15/025 137/329.04 |
| 9,579,779 B1 | | 2/2017 | Hunter |
| 10,167,859 B2 | * | 1/2019 | Deel ........................ F04B 1/122 |
| 2011/0173814 A1 | | 7/2011 | Patel |
| 2018/0029209 A1 | * | 2/2018 | Nicholson ............... E21B 23/00 |
| 2020/0055172 A1 | * | 2/2020 | Tyler ...................... B25B 27/24 |

FOREIGN PATENT DOCUMENTS

| | | | |
|---|---|---|---|
| CN | 102513964 A | * | 6/2012 |
| CN | 209533246 U | | 10/2019 |
| CN | 211103738 U | | 7/2020 |
| CN | 212192973 U | | 12/2020 |
| CN | 112548941 A | | 3/2021 |
| CN | 212947572 U | | 4/2021 |
| CN | 215148667 U | | 12/2021 |

\* cited by examiner

*Primary Examiner* — Marina A Tietjen
(74) *Attorney, Agent, or Firm* — Christopher J. Owens

(57) ABSTRACT

A valve seat installation tool is disclosed. The valve seat installation tool includes a force conversion shaft extending from a shaft front surface to a shaft rear surface along a central axis, a torque nut secured to the force conversion shaft adjacent to the shaft front surface, a head adjacent to the shaft rear surface and a pump adapter secured to the force conversion shaft between the torque nut and the head.

20 Claims, 9 Drawing Sheets

VALVE SEAT INSTALLATION TOOL SYSTEM

FIELD OF THE INVENTION

The present invention relates to installation tools for valve seats, and more particularly an installation tool for securing valve seats in their respective pumps.

BACKGROUND INFORMATION

Valve seats are often replaced in order to ensure proper pressure sealing during a pumping operation. Valve seats are often replaced using hydraulic insertion tools. Hydraulic insertion tools often require a significant amount of space and are difficult to utilize in the field. A mechanical insertion tool utilizing mechanical torque may allow for valve seat installation to occur at site of their respective pump, while also allowing for simplified installation with standardized torques.

SUMMARY OF THE INVENTION

The present invention provides a valve seat installation tool and a method of installing a valve seat. The valve seat installation tool includes a force conversion shaft extending from a shaft front surface to a shaft rear surface along a central axis, a torque nut secured to the force conversion shaft adjacent to the shaft front surface, a head adjacent to the shaft rear surface and a pump adapter secured to the force conversion shaft between the torque nut and the head.

An aspect of the present invention is to provide a valve seat installation tool including a force conversion shaft extending from a shaft front surface to a shaft rear surface along a central axis, a torque nut secured to the force conversion shaft adjacent to the shaft front surface, and a pump adapter secured to the force conversion shaft between the torque nut and the shaft rear surface.

Another aspect of the present invention is to provide a method of installing a valve seat including inserting the valve seat into a pump body. A head is then inserted into the valve seat. Next, a pump adapter is secured to a pump opening of the pump body. Then a force conversion shaft is secured to the pump adapter, wherein the force conversion shaft extends from a shaft front surface to a shaft rear surface along a central axis and the pump adapter is secured between the shaft front surface and the shaft rear surface. The force conversion shaft is then inserted into the pump body such that the force conversion shaft moves along the central axis relative to the pump adapter until the shaft rear surface comes in contact with the head. A socket of a torque wrench is attached to a torque nut, wherein the torque nut is secured to the force conversion shaft adjacent to the shaft front surface. Finally, the torque nut is rotated in a first direction with the socket.

These and other aspects of the present invention will be more apparent from the following description.

DETAILED DESCRIPTION

Figure 1:
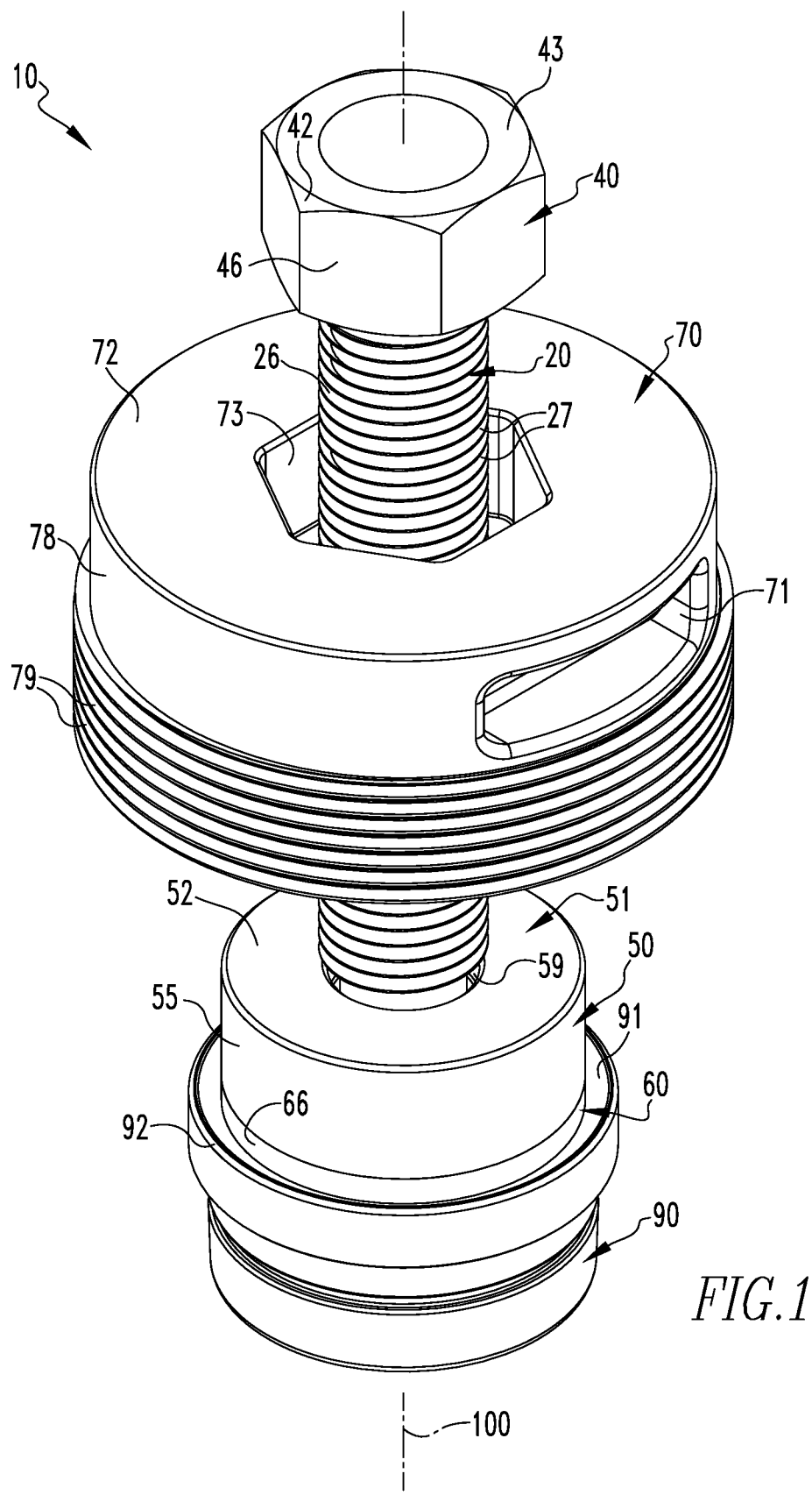
FIG. 1 is an isometric view of an installation tool in accordance with an embodiment of the present invention.
Figure 2:
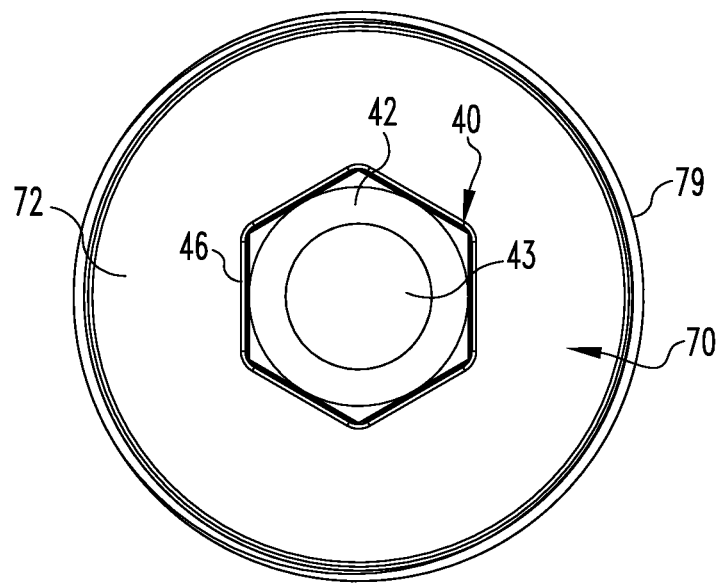
FIG. 2 is a top view of the installation tool of FIG. 1.
Figure 3:
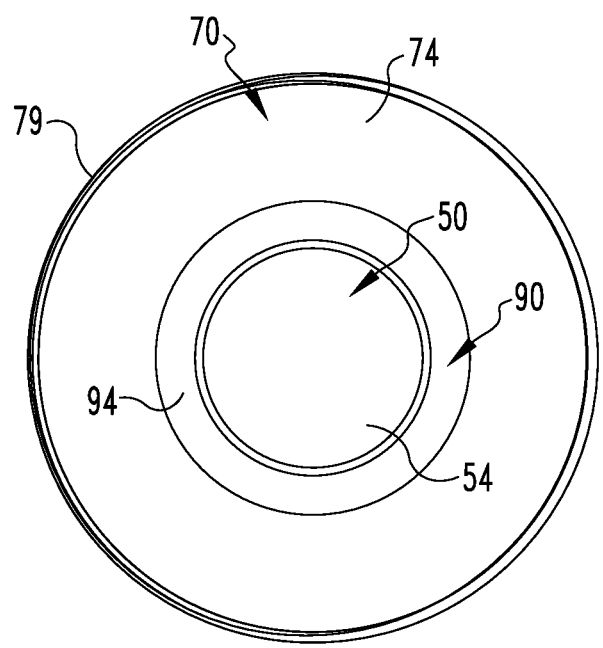
FIG. 3 is a bottom view of the installation tool of FIG. 1.
Figure 4:
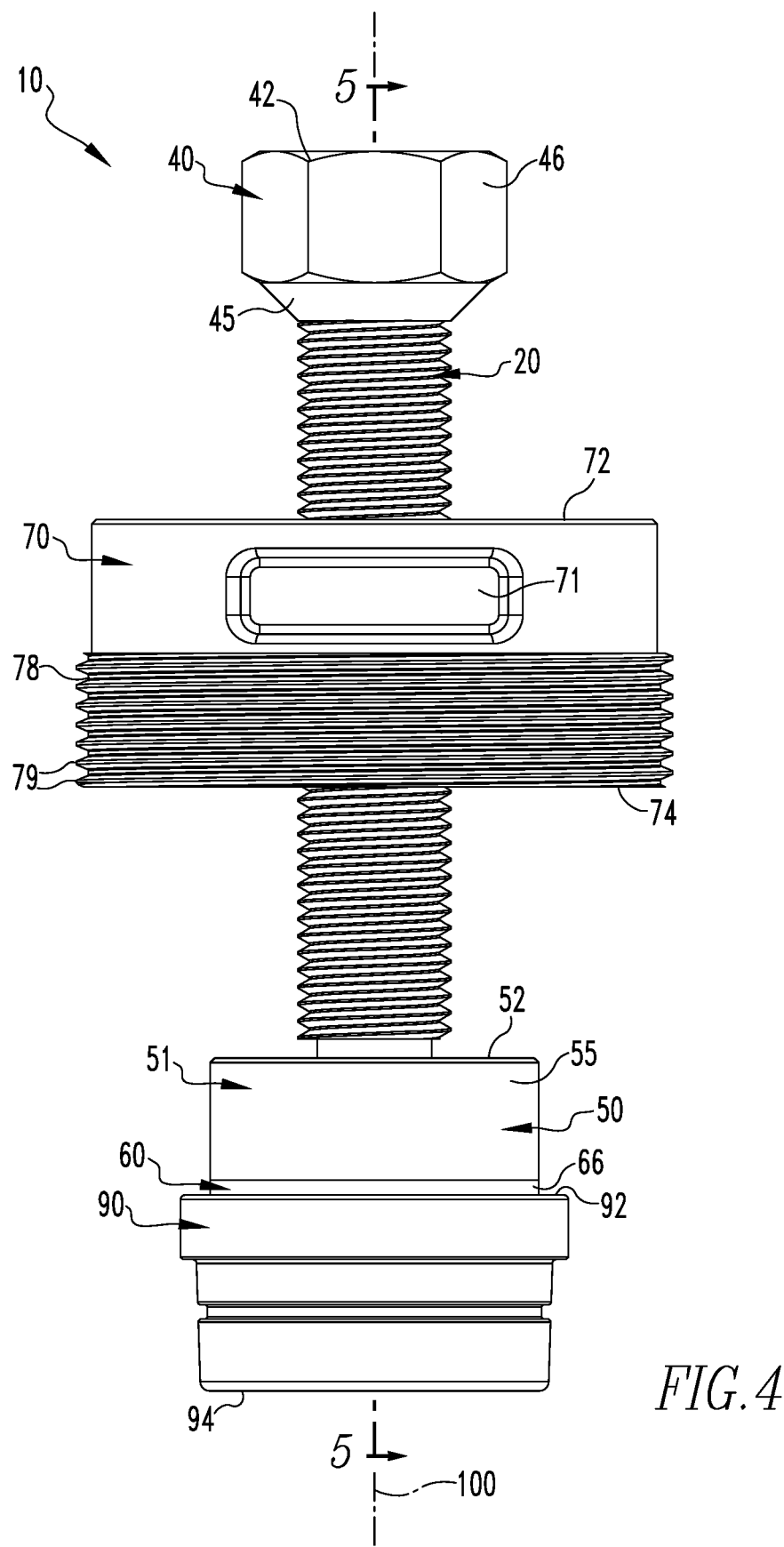
FIG. 4 is a side view of the installation tool of FIG. 1 with a valve seat.
Figure 5:
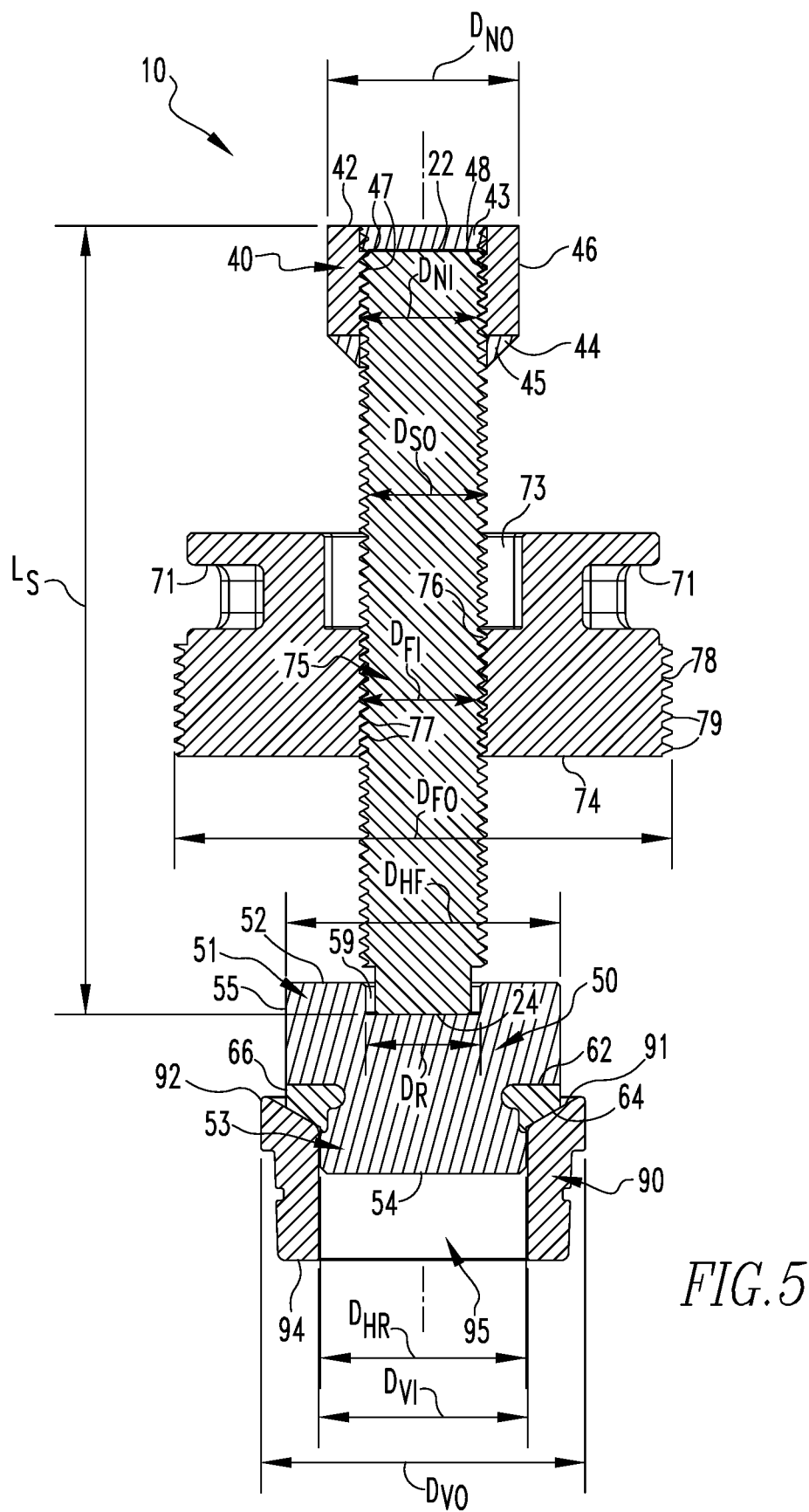
FIG. 5 is a side sectional view of the installation tool of FIG. 1 taken through section 5-5 of FIG. 4 with a valve seat.

The installation tool of the present invention addresses the issues mentioned above by providing a valve seat installation tool that can insert a valve seat through mechanical forces. The valve seat installation tool can be operated using standard torque wrenches.

The installation tool provides several benefits to the installation of valve seats. The installation tool can be operated without hydraulic equipment, resulting in a simpler installation. The installation tool also allows for calibrated installation such that valve seats can be installed with an adequate force for each valve seat type. The installation tool can also allow the same force regardless of the strength capabilities of the user. The simplified design also allows the installation to occur at the site of the respective pump.

Referring to FIGS. 1-7, an installation tool 10 is shown including a force conversion shaft 20, a torque nut 40, a head 50, a pump adapter 70 and a valve seat 90.

The force conversion shaft 20 may extend along a central axis 100 from a shaft front surface 22 to a shaft rear surface 24. The force conversion shaft 20 may be cylindrical in shape. The shaft outside surface 26 may include a shaft set of threads 27 around the outside circumference of the force conversion shaft 20. The shaft set of threads 27 may extend axially down the entire length of the force conversion shaft 20 between the shaft front surface 22 and the shaft rear surface 24, or down a partial length of the force conversion shaft 20. The force conversion shaft 20 may be made of a steel material, such as a stainless steel, alloy steel or carbon steel, or other ductile material.

The shaft set of threads 27 may have a thread density of at least 2 threads per inch, for example, 3 threads per inch, 4 threads per inch, or 4.5 threads per inch. The shaft set of threads 27 may have a thread density of at most 7 threads per inch, for example, at most 6 threads per inch, at most 5.5 threads per inch, or at most 5 threads per inch.

The force conversion shaft 20 may have a shaft length $L_S$ that is at least 6 inches, for example, at least 1.5 feet or at least 3 feet. The shaft length $L_S$ may be at most 6 feet, for example, at most 5 feet or at most 4 feet. The shaft length $L_S$ may range from 6 inches to 6 feet, for example, from 1.5 feet to 5 feet, or from 3 feet to 4 feet.

The force conversion shaft 20 may have a shaft outer diameter $D_{SO}$ that is at least 1 inch, for example, at least 1.5 inches or at least 2 inches. The shaft outer diameter $D_{SO}$ may be at most 4 inches, for example, at most 3 inches or at most 2.5 inches. The shaft outer diameter $D_{SO}$ may range from 1 inch to 4 inches, for example, from 1.5 inches to 3 inches, or from 2 inches to 2.5 inches.

The force conversion shaft 20 may be structured and arranged to withstand the predetermined torque required to install the valve seat 90. The predetermined torque may be at least 250 lbf-ft, for example, at least 500 lbf-ft, or at least 800 lbf-ft. The predetermined torque may be at most 6400 lbf-ft, for example, at most 4000 lbf-ft, or at most 1600 lbf-ft. The predetermined torque may range from 250 lbf-ft to 6400 lbf-ft, for example, from 500 lbf-ft to 4000 lbf-ft, or from 800 lbf-ft to 1600 lbf-ft. The force conversion shaft 20 may be structured and arranged to convert the torque force into a linear force applied through the shaft rear surface 24.

A torque nut 40 may be secured to the force conversion shaft 20 adjacent to the shaft front surface 22. The torque nut 40 may be structured and arranged to be rotated by a torque wrench. Rotation of the torque nut 40 may transfer the rotational force to the force conversion shaft 20, causing the force conversion shaft 20 to rotate.

The torque nut 40 may extend from a nut front face 42 to a nut rear face 44. The nut outside surface 46 may be located between the nut front face 42 and nut rear face 44, and may be hex shaped, square shaped, triangular shaped and/or the like. The nut outside surface 46 may be structured and arranged to receive a socket of a torque wrench (not shown). The torque nut 40 may be structured and arranged on the force conversion shaft 20 such that the force conversion shaft 20 would not impede a torque wrench socket from attaching to the nut outside surface 46.

The torque nut 40 may include a nut set of threads 47 on the nut inside surface 48 of the torque nut 40 that are structured and arranged to form a threaded connection with the shaft set of threads 27. The nut set of threads 47 may have the same thread density (e.g., threads per inch) as the shaft set of threads 27. The nut inside surface 48 may have nut inner diameter $D_{NI}$ that is equal to or greater than the shaft outer diameter $D_{SO}$. The nut outside diameter $D_{NO}$ may be at least half an inch greater than the shaft outer diameter $D_{SO}$, for example, at least ¾ inch, or at least 1 inch. The nut outside diameter $D_{NO}$ may be at most 2 inches greater than the shaft outer diameter $D_{SO}$, for example, at most 1.5 inches greater, or at most 1.25 inches greater.

The torque nut 40 may be initially secured to the force conversion shaft 20 by rotating the torque nut 40 in a clockwise or counterclockwise direction around the force conversion shaft 20. The nut set of threads 47 may interact with the shaft set of threads 27, pulling the torque nut 40 in the axial direction along the central axis 100 toward the shaft rear surface 24.

The torque nut 40 may be welded to the force conversion shaft 20 to create a permanent connection between the torque nut 40 and the force conversion shaft 20. The torque nut 40 may be welded to the force conversion shaft 20 through any welding means, such as arc welding, metal inert gas welding, laser welding and/or the like. The torque nut 40 may be welded at the nut front face 42 and/or the nut rear face 44. A front weld joint 43 may be formed on the nut front face 42. A rear weld joint 45 may be formed on the nut rear face 44. The front weld joint 43 and/or the rear weld joint 45 may be formed around the entire outer circumference of the force conversion shaft 20. The permanent connection of the torque nut 40 to the force conversion shaft 20 may allow the torque nut 40 to transfer rotational force to the force conversion shaft 20. In some non-limiting embodiments or aspects, the torque nut 40 may be secured to the force conversion shaft 20 through other suitable means for forming a permanent connection. The torque nut 40 may be formed with the force conversion shaft 20, such as through 3D printing or through molding.

The torque nut 40 may be made of the same or different material as the force conversion shaft 20. The torque nut 40 may be made of a steel, such as a stainless steel, alloy steel or carbon steel, or ductile material.

A pump adapter 70 may be secured to the force conversion shaft 20 between the head 50 and the torque nut 40. The pump adapter 70 may be releasably attached to the force conversion shaft 20. The pump adapter 70 may be cylindrical in shape and may extend from a pump adapter front surface 72 to a pump adapter rear surface 74. The pump adapter front surface 72 may be oriented to face towards the shaft front surface 22 when the pump adapter 70 is secured to the force conversion shaft 20. The pump adapter rear surface 74 may be oriented to face towards the shaft rear surface 24 when the pump adapter 70 is secured to the force conversion shaft 20.

The pump adapter 70 may have a pump adapter center hole 75 structured and arranged to receive the force conversion shaft 20. The pump adapter inner diameter $D_{FI}$ of the pump adapter 70, defined by the pump adapter center hole 75, may be equal to or greater than the shaft outer diameter $D_{SO}$. The pump adapter inner diameter $D_{FI}$ may be the same as the nut inner diameter $D_{NI}$. A pump adapter set of inner threads 77 may be arranged on the pump adapter inner surface 76. The pump adapter set of inner threads 77 may be structured and arranged to engage with the shaft set of threads 27. The pump adapter set of inner threads 77 may extend through the entire axial length or partial axial length of the pump adapter inner surface 76.

The pump adapter 70 may be structured and arranged to connect to an opening, such as a pump body 112. The pump adapter 70 may include a pump adapter set of outer threads 79 on the pump adapter outer surface 78. The pump adapter set of outer threads 79 may be oriented in an opposite direction than the pump adapter set of inner threads 77. The pump adapter outer diameter $D_{FO}$ may be less than or equal to the diameter of the opening of the pump body 112. The pump adapter set of outer threads 79 may be structured and arranged to make a threaded connection with a set of threads arranged on an inside surface of an opening of a pump body 112. The pump adapter set of outer threads 79 may be buttress threading. The pump adapter set of outer threads 79 may extend along at least a portion of the axial length of the pump adapter 70 between the pump adapter front surface 72 and the pump adapter rear surface 74.

The pump adapter 70 may include a pump adapter recess 73 on the pump adapter front surface 72. The pump adapter recess 73 may be centered around the pump adapter center hole 75. The pump adapter recess 73 may be structured and arranged to receive a tool bit to rotate the pump adapter 70. The pump adapter recess 73 may be hex shaped, cross shaped, square shaped, star shaped or other geometric shape.

The pump adapter 70 may include one or more handles 71 on the pump adapter outer surface 78. The handles 71 may be structured and arranged to receive the fingers or hands of a user to aid in lifting of the pump adapter 70 by the user. The handles 71 may be slots extending from the pump adapter outer surface 78 towards the pump adapter inner surface 76. The handles 71 may extend a partial length around the circumference of the pump adapter outer surface 78. When the pump adapter 70 is installed on the pump body 112, the one or more handles 71 may extend outward of the pump body 112 such that the handles 71 remain accessible when the pump adapter 70 is fully installed.

Figure 6:
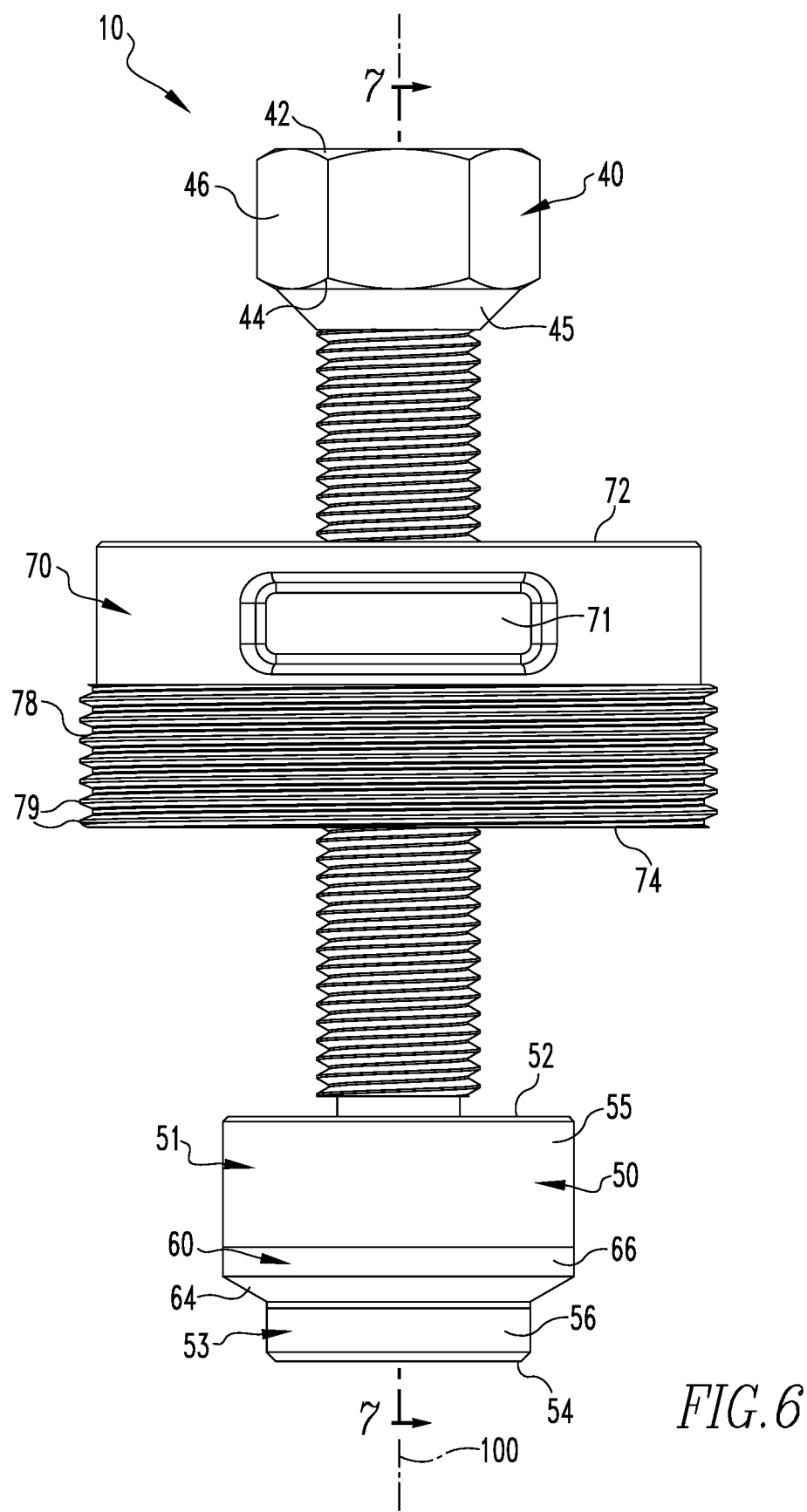
FIG. 6 is a side view of the installation tool of FIG. 1 without a valve seat.
Figure 7:
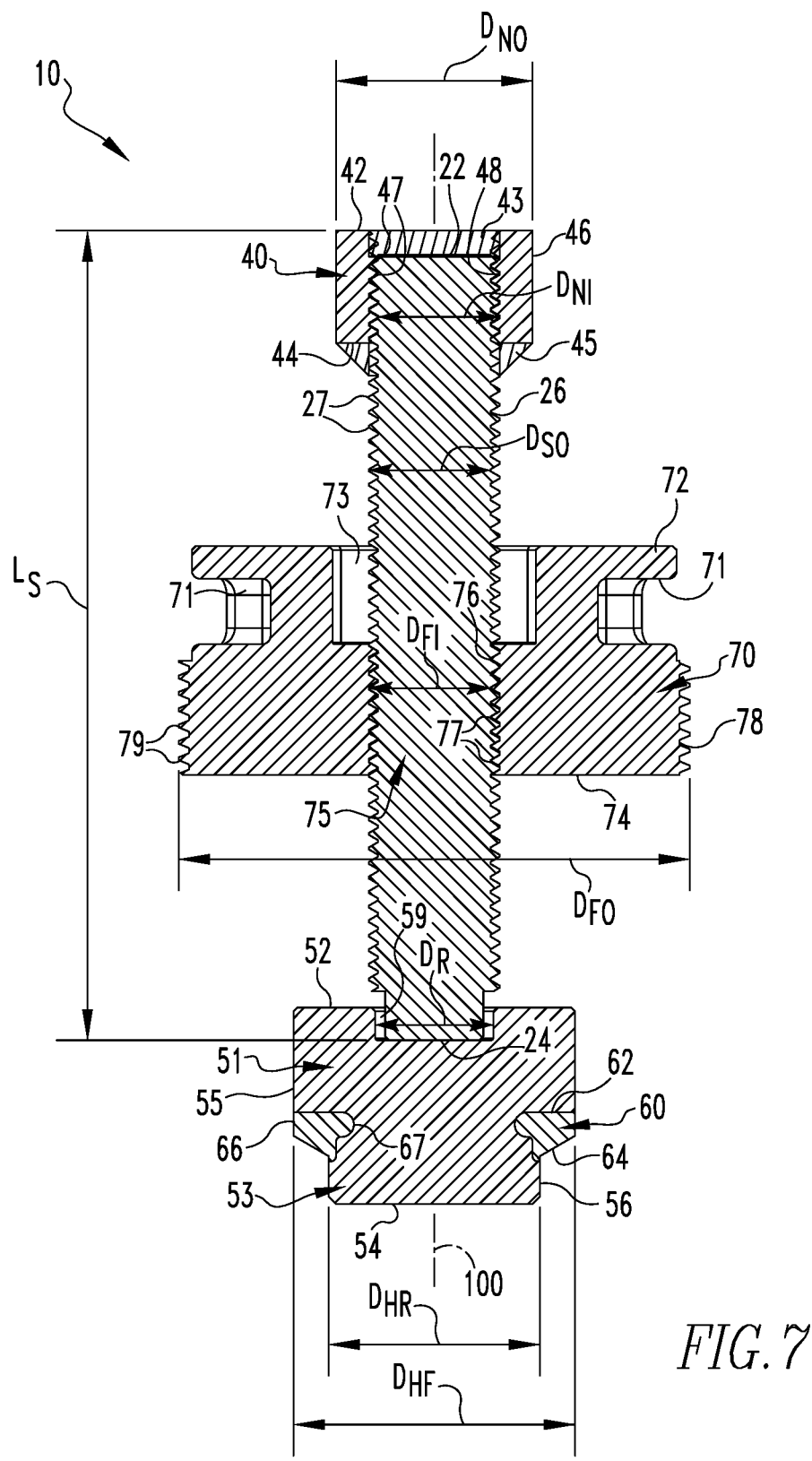
FIG. 7 is a side sectional view of the installation tool of FIG. 1 taken through section 7-7 of FIG. 6 without a valve seat.

The shaft rear surface 24 of the force conversion shaft 20 may be placed on a head 50, shown without a valve seat 90 in FIGS. 6 and 7. The force conversion shaft 20 may be inserted into a head recess 59 of the head 50, the head recess 59 having a recess diameter DR that is greater than or equal to the shaft outer diameter $D_{SO}$. The head recess 59 may extend along a head recess side surface 58 from the head front surface 52 toward the head rear surface 54 to a head recess bottom surface 57. The shaft rear surface 24 may make contact with or be pressed against the head recess bottom surface 57. A recess diameter DR being greater than the shaft outer diameter $D_{SO}$ may allow for variation of the location of the shaft rear surface 24 against the head recess bottom surface 57 such that the shaft rear surface 24 need not be inserted into an exact position against the head recess bottom surface 57, but instead may be placed anywhere within the head recess 59. The head 50 may have various sizes corresponding to the valve seat 90 to be installed into the pump body 112. For example, a larger valve seat 90 may result in a larger head 50 structured and arranged to secure the valve seat 90.

In some non-limiting embodiments or aspects, the head 50 may be releasably or permanently secured to the force conversion shaft 20. The head 50 may be secured to the force conversion shaft 20 by a threaded connection. The head 50 may be welded to the force conversion shaft 20 or may be formed as a single component with the force conversion shaft 20.

The head 50 may be structured and arranged to receive a valve seat 90. The head 50 may be cylindrical in shape. The head 50 may extend from a head front surface 52 to a head rear surface 54. The head front surface 52 may be oriented to face the shaft front surface 22 when the head 50 is adjacent to the force conversion shaft 20. The head recess 59 may be located at the center of the head front surface 52. The head rear surface 54 may be oriented to face away from the shaft rear surface 24 when the head 50 is adjacent to the force conversion shaft 20. The head 50 may extend along the central axis 100. The head 50 may include a front end 51 adjacent to the head front surface 52 and a rear end 53 adjacent to the head rear surface 54.

The front end 51 may have a head front end outer diameter $D_{HF}$ that is the same as or greater than the head rear end outer diameter $D_{HR}$. The head front end outer diameter $D_{HF}$ may be less than the pump adapter outer diameter $D_{FO}$. The rear end 53 may be structured and arranged to be inserted into the valve seat hole 95 of the valve seat 90. The head rear end outer diameter $D_{HR}$ may be equal to or less than the valve seat inner diameter $D_{VT}$.

The head 50 may include a ring 60. The ring 60 may be made of an elastic material, such as polyurethane, and may be cylindrical in shape. The ring 60 may be made of a material that has a hardness that is lower than the hardness of the valve seat 90. The material of the ring 60 may be different than the material of the head 50. The material of the ring 60 may be softer than the material of the head 50. Using softer material for the ring 60 compared to the material of the head 50 and/or the valve seat 90 may reduce the likelihood of the valve seat 90 being damaged during installation, thus increasing the potential life of the valve seat 90.

The ring 60 may be structured and arranged to receive the valve seat 90 and to fit the outside shape of the valve seat 90. The ring 60 may be attached to the head 50, and may be located between the front end 51 and the rear end 53. The ring 60 may be located on a rear end outer surface 56. The ring outside surface 66 may align with the front end outer surface 55.

The ring 60 may extend from a ring front surface 62 to a ring rear surface 64. The ring front surface 62 may face the shaft front surface 22 when the head 50 is installed on the force conversion shaft 20. The ring rear surface 64 may be oriented to face away from the shaft rear surface 24 when the head 50 is secured to the force conversion shaft 20. The ring inner surface 67 may be in contact with the rear end outer surface 56. The ring front surface 62 may be adjacent to the front end 51. The ring 60 may be secured to the head 50 through an adhesive, mold fit, threaded fit and/or the like.

The ring rear surface 64 may be structured and arranged to receive the valve seat 90. The ring rear surface 64 may deform when coming in contact with the valve seat 90. The ring rear surface 64 may deform to match the contour of the valve seat 90, resulting in a tighter fit of the ring 60 to the valve seat 90. The ring rear surface 64 may be conical in shape and may be angled to receive the valve seat 90.

The valve seat 90, shown in FIGS. 1, 3, 4, and 5, may be structured and arranged to be inserted into a valve, such as a frac valve. The valve seat 90 may be cylindrical in shape. The valve seat 90 may extend from a valve seat front surface 92 to a valve seat rear surface 94. The valve seat 90 may extend in a radial direction from a valve seat inner surface 96 defined by a valve seat hole 95 to a valve seat outer surface 97. The valve seat front surface 92 may be oriented to face the shaft front surface 22 when the valve seat 90 is secured to the installation tool 10. The valve seat rear surface 94 may be oriented to face away from the shaft rear surface 24 when the valve seat 90 is secured to the installation tool 10.

The valve seat front surface 92 may include a valve seat conical surface 91 centered around the valve seat hole 95. The valve seat hole 95 may extend in the axial direction along the central axis 100 from the valve seat front surface 92 to the valve seat rear surface 94. The valve seat conical surface 91 may be structured and arranged to be received by the ring rear surface 64. A valve seat inner surface 96 is defined by the valve seat hole 95. The valve seat inner surface 96 may be cylindrical in shape. The valve seat inner diameter $D_{VT}$ of the valve seat inner surface 96 may be less than or equal to the head rear end outer diameter $D_{HR}$. When the valve seat 90 is installed on the head 50, the valve seat inner surface 96 may form a friction fit with the rear end outer surface 56 of the head 50. The valve seat outer diameter $D_{VO}$ may be less than the pump adapter outer diameter $D_{FO}$ such that the valve seat 90 may fit within the pump body 112.

The valve seat 90 may include a valve seat lip 98 located on the valve seat outer surface 97 proximate the valve seat front surface 92. The valve seat lip 98 may extend in a radial direction outward from the valve seat hole 95. The valve seat lip 98 may extend along a plane perpendicular to the central axis 100.

The valve seat 90 may be inserted into a pump 110, as shown in FIGS. 9A-10B. The pump 110 may include a pump body 112. One end of the pump body 112 may include a pump 120. The pump 120 may include a pump opening 122, the pump opening 122 being structured and arranged to receive a pump adapter 70. The pump opening 122 may define a pump opening inner surface 124. The pump opening inner surface 124 may be threaded and structured and arranged to form a threaded connection with the pump adapter set of outer threads 79.

The pump body 112 may encase a pump chamber 114, the pump chamber 114 being an open space located within the pump 110. The pump chamber 114 may be in fluid communication with the pump opening 122 through a pump valve slot 116. The pump valve slot 116 may extend from the pump chamber 114 to towards the pump opening 122. The pump valve slot 116 may be defined by a pump valve slot wall 118, the pump valve slot wall 118 may be cylindrical in shape and may be structured and arranged to receive a valve seat 90. The pump valve slot 116 may end at a pump valve slot ledge 117 located at the end of the valve slot 116 closest to the pump opening 122. The pump valve slot ledge 117 may be planar in shape and may be perpendicular to the central axis 100. The pump valve slot ledge 117 may expand radially from the pump valve slot 116.

Figure 8:
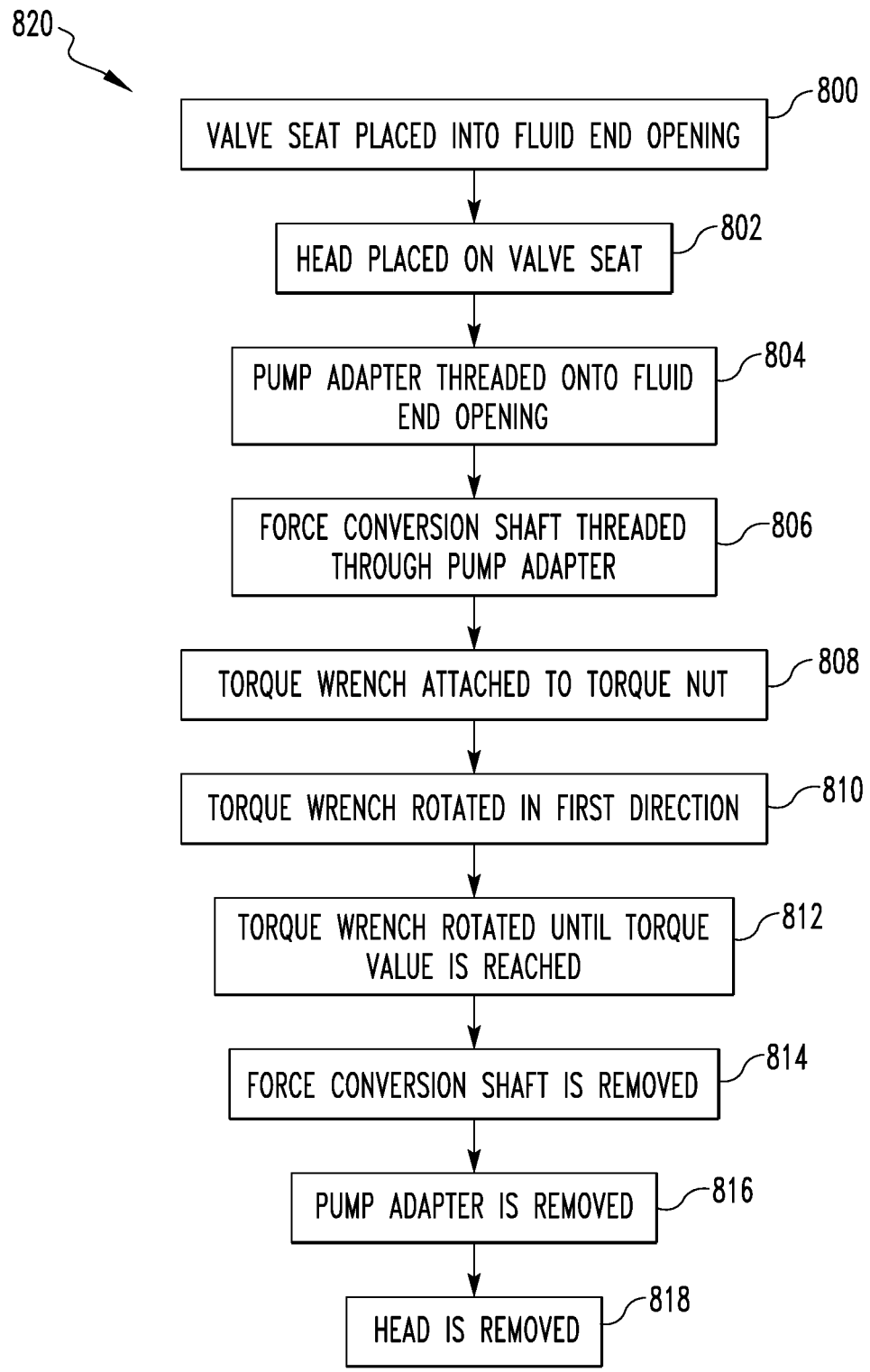
FIG. 8 is a diagram of a method of installing a valve seat with an installation tool.
Figures 9A, 9B:
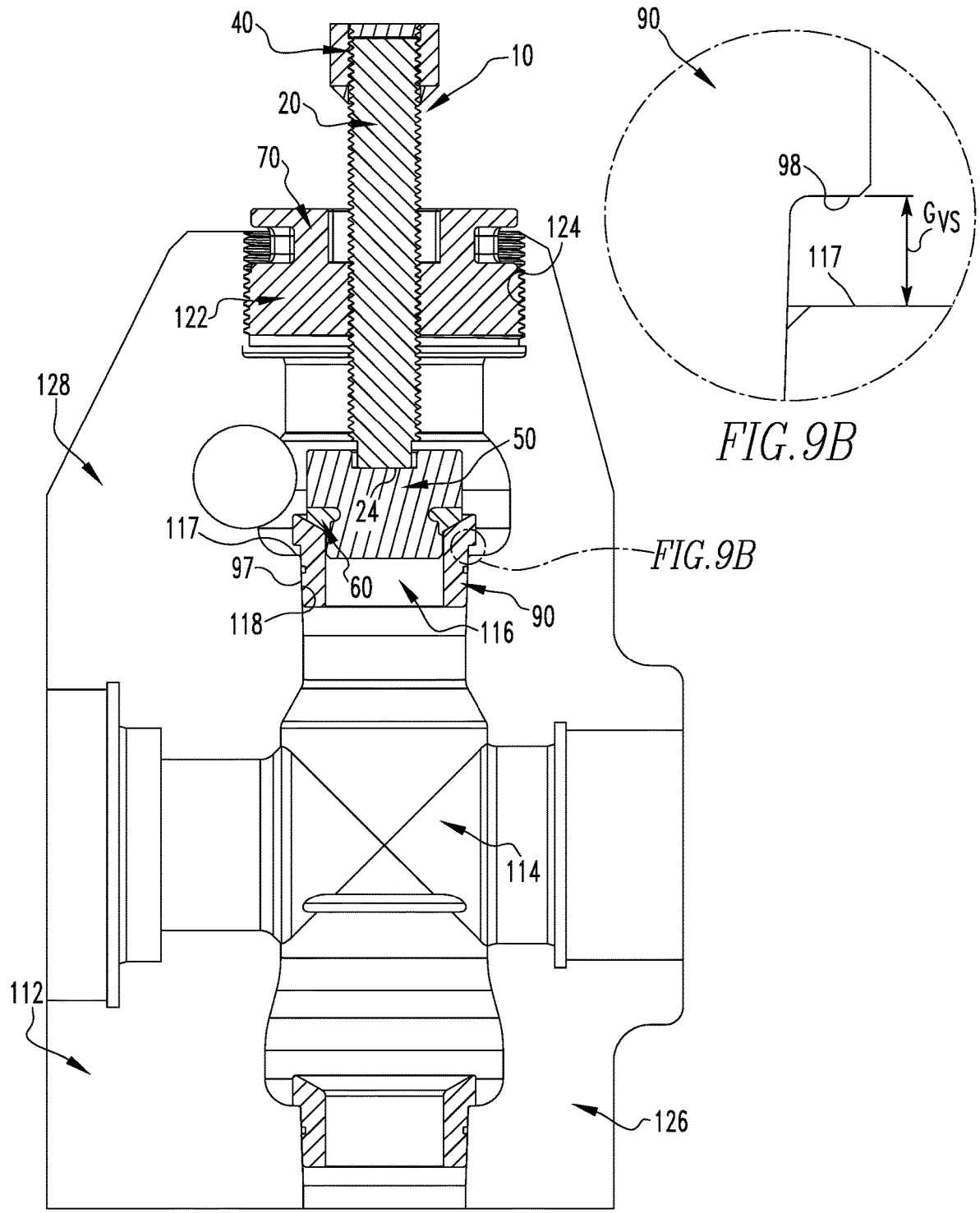
FIG. 9A is a side sectional view of the installation tool of FIG. 1 inserted into a pump in a pre-installed position.
FIG. 9B is closeup view of the installation tool of FIG. 1 in the pre-installed position.

The installation tool 10 may be used to install the valve seat 90 into a fluid body of a pump 110 using the following installation method 820, as shown in FIG. 8.

In step 800, the valve seat 90 is placed through the pump opening 122 of the pump 110. The valve seat 90 may be placed by hand through the pump opening 122. The valve seat 90 may be oriented such that the valve seat rear surface 94 is facing away from the pump opening 122 and the valve seat front surface 92 is facing toward the pump opening 122. The valve seat outer surface 97 may be inserted through the pump valve slot 116 such that the valve seat outer surface 97 is in contact with the pump valve slot wall 118. When inserted, there may be a valve seat gap $G_{VS}$, measured as the distance between the valve seat lip 98 and the pump valve slot ledge 117. The valve seat gap $G_{VS}$ may be at least 0.1 inches, for example, at least 0.2 inches, or at least 0.25 inches. The valve seat gap $G_{VS}$ may be at most 0.5 inches, for example, at most 0.4 inches, or at most 0.3 inches. The valve seat gap $G_{VS}$ may range from 0.1 inches to 0.5 inches, for example, from 0.2 inches to 0.4 inches or from 0.25 inches to 0.3 inches.

In step 802, the head 50 is placed onto the valve seat 90. The head 50 may be inserted through the pump opening 122 and oriented such that the rear end outer surface 57 is facing away from the pump opening 122. The head 50 may be placed onto the valve seat 90 by moving the head 50 along the central axis 100 in the axial direction toward the valve seat hole 95. The rear end 53 may be inserted into the valve seat hole 95 such that the valve seat inner surface 96 comes in contact with the rear end outer surface 56. The head 50 may be moved in the axial direction until the valve seat conical surface 91 comes in contact with the ring rear surface 64. The valve seat 90 and the head 50 may form a friction fit of the head 50 onto the valve seat 90. The shape and size of the head 50 may be specific to the valve seat 90 to be installed. Different sized and shaped heads 50 may be used with the same force conversion shaft 20 and torque nut 40.

In step 804, the pump adapter 70 is secured to the pump opening 122. The pump adapter 70 may be specific to the pump body 112 in which the valve seat 90 is to be installed. The pump adapter 70 may be secured to a pump opening 122 through a threaded connection. The pump adapter set of outer threads 79 may make a threaded connection with the threads of the pump opening inner surface 124. The pump adapter 70 may be locked into position.

In step 806, the force conversion shaft 20 may be threaded through the pump adapter 70. The same force conversion shaft 20 may be used with different sized pump adapters 70 based on the pump body 112. The shaft rear end 24 may be inserted into the pump adapter center hole 75. The force conversion shaft 20 may be rotated to form a threaded connection between the shaft set of threads 27 and the pump adapter inner set of threads 77. The force conversion shaft 20 may be rotated in a first direction. The first direction may be a clockwise or counterclockwise direction. The rotation of the force conversion shaft 20 within the pump adapter 70 will cause the force conversion shaft 20 to move in the axial direction relative to the pump adapter 70 as the shaft set of threads 27 interacts with the pump adapter set of inner threads 77, pushing the shaft rear surface 24 further into the pump body 112. The force conversion shaft 20 may be rotated until the shaft rear end 24 comes in contact with the head recess bottom surface 57. The initial insertion of the force conversion shaft 20 may be completed by hand, wrench, torque wrench or other tool.

In step 808, a socket of a torque wrench is attached to the torque nut 40. The socket of the torque wrench may be attached to the torque nut 40 by moving the socket in the axial direction along the central axis 100 toward the nut front face 42. The socket of the torque wrench may come in contact with the nut outside surface 46. The socket of the torque wrench may be attached to a torque wrench set with a predetermined torque value. The torque wrench may include one or more torque multipliers.

In step 810, the torque wrench is rotated in the first direction. As the torque wrench is rotated, it applies the rotational force to the torque nut 40. The torque nut 40 then transfers the rotational force to the force conversion shaft 20 due to the torque nut 40 being welded to the force conversion shaft 20. Due to the pump adapter 70 being secured to the pump opening 122, as the force conversion shaft 20 rotates, the pump adapter 70 remains in place and the shaft rear end 24 continues to move in the axial direction towards the pump chamber 114. The further axial movement of the force conversion shaft 20 after contact is made with the head recess bottom surface 57 causes the shaft rear surface 24 to apply a linear force on the head recess bottom surface 57. The force on the head recess bottom surface 57 causes the head 50 to move in the axial direction, which then applies the force onto the valve seat 90. The valve seat 90 may then move in the axial direction away from the pump opening 122. As the valve seat 90 moves in the axial direction, the valve seat gap $G_{SV}$ begins to decrease in size as the valve seat lip 98 moves towards the pump valve slot ledge 117.

Figures 10A, 10B:
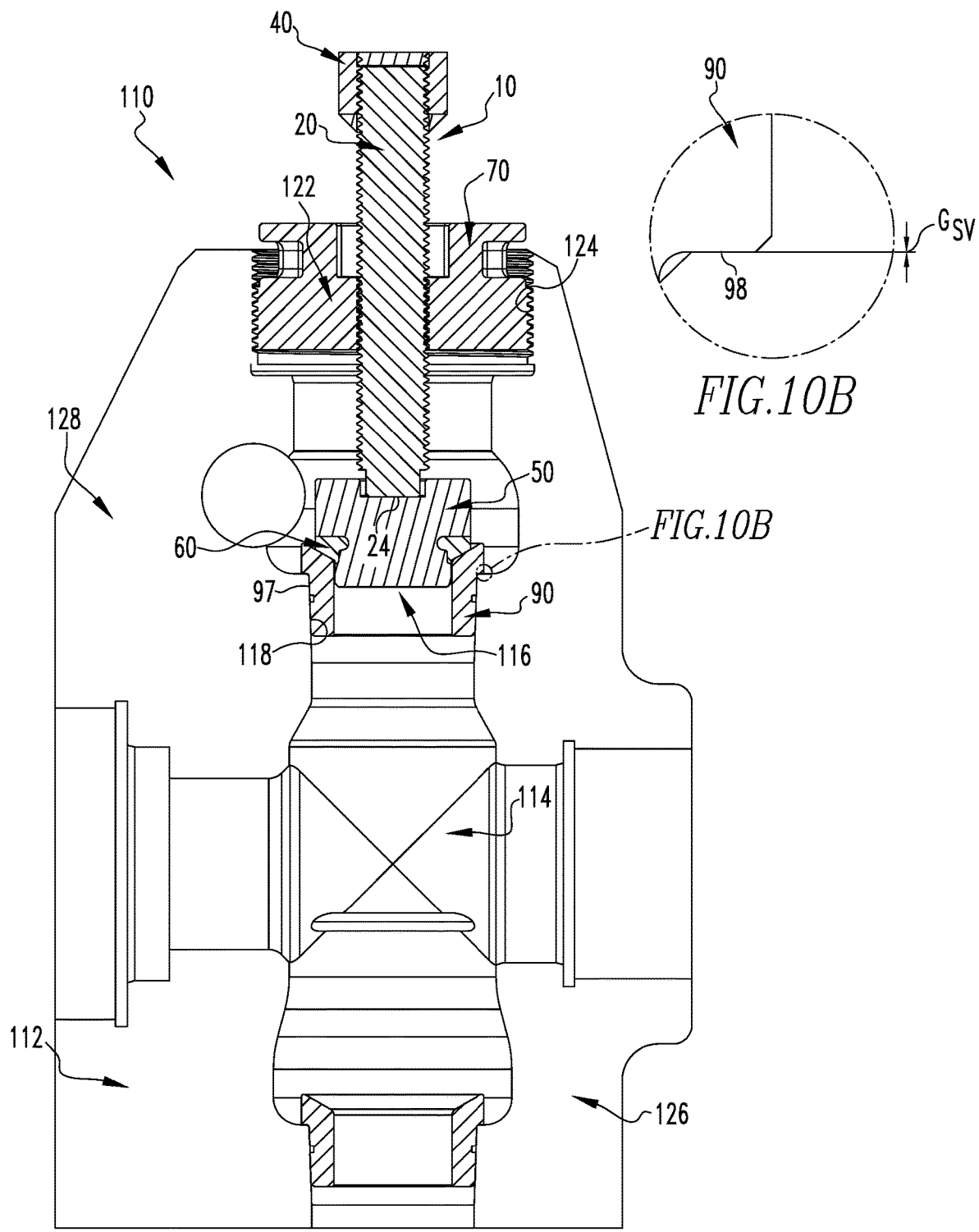
FIG. 10A is a side sectional view of the installation tool of FIG. 1 inserted into a pump in a post-installed position.
FIG. 10B is a closeup view of the installation tool of FIG. 1 in the post-installed position.

In step 812, the torque wrench continues to rotate the torque nut 40 until the torque wrench measures a torque value that meets or exceeds a predetermined torque value. The predetermined torque value may be determined based on the properties of the pump body and/or valve seat 90. The predetermined torque value may be determined based on the predetermined installation force of the valve seat 90. The predetermined installation force may be at least 15,000 lbf, for example, at least 19,000 lbf, at least 22,000 lbf or at least 24,400 lbf. The predetermined installation force may be at most 200,000 lbf, for example at most 180,000 lbf, at most 140,000 lbf or at most 120,000 lbf. The predetermined installation force may range from 15,000 lbf to 200,000 lbf, for example, from 19,000 lbf to 180,000 lbf, from 22,000 lbf to 140,000 lbf, or from 24,400 lbf to 120,000 lbf. The valve seat gap $G_{SV}$ may decrease to zero as the valve seat lip 97 comes in contact with the pump valve slot ledge 117, as shown in FIGS. 10A and 10B.

The predetermined torque value may also be determined based on the physical properties of the force conversion shaft 20, such as the friction coefficient, thread pitch, thread depth, helix angle, and normal thread angle. The predetermined torque may be based on previously completed testing of various torque values for various valve types. The predetermined torque may be at least 250 lbf-ft, for example, at least 500 lbf-ft, or at least 800 lbf-ft. The predetermined torque may be at most 6400 lbf-ft, for example, at most 4000 lbf-ft, or at most 1600 lbf-ft. The predetermined torque may range from 250 lbf-ft to 6400 lbf-ft, for example, from 500 lbf-ft to 4000 lbf-ft, or from 800 lbf-ft to 1600 lbf-ft. Once the predetermined torque value is reached, the valve seat 90 will be adequately secured to the pump body.

In step 814, the force conversion shaft 20 is removed. The force conversion shaft 20 is rotated in a second direction, the second direction being opposite of the first direction. As the force conversion shaft 20 is rotated in the second direction, the force conversion shaft 20 moves in an axial direction out of the pump adapter 70. The force conversion shaft 20 is rotated until the threaded connection between the force conversion shaft 20 and the pump adapter 70 is disconnected.

In step 816, the pump adapter 70 is disconnected from the pump opening 122. The pump adapter 70 may be disconnected from the pump opening 122 by rotation of the pump adapter 70.

In step 812, the head 50 is removed from the pump 110. The head 50 may be removed by hand by a user. In some non-limiting embodiments, the installation method may be used to install both a valve seat 90 on the suction side 126 of the pump body 112 as well as the discharge side 128 of the pump body 112. The valve seat 90 may be installed on the suction side 126 before a second valve seat is installed in the discharge side 128. The suction side 126 may be separated from the discharge side 128 in an axial direction by the pump chamber 114.

It should also be understood that some steps in the method may be completed in a different order than what is shown. For, example, in some non-limiting embodiments or aspects, prior to installation of the valve seat 90, the pump adapter 70 may be threaded to the force conversion shaft 20. The pump adapter 70 may be attached to the force conversion shaft 20 through a threaded connection. The pump adapter 70 may be inserted onto the shaft rear surface 24 by moving the pump adapter 70 along the central axis 100 in the axial direction toward the shaft rear surface 24. The pump adapter 70 may be attached to the force conversion shaft 20 by rotating the pump adapter 70 in a clockwise or counterclockwise direction.

As used herein, "including," "containing" and like terms are understood in the context of this application to be synonymous with "comprising" and are therefore open-ended and do not exclude the presence of additional undescribed or unrecited elements, materials, phases or method steps. As used herein, "consisting of" is understood in the context of this application to exclude the presence of any unspecified element, material, phase or method step. As used herein, "consisting essentially of" is understood in the context of this application to include the specified elements, materials, phases, or method steps, where applicable, and to also include any unspecified elements, materials, phases, or method steps that do not materially affect the basic or novel characteristics of the invention.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. In this application and the appended claims, the articles "a," "an," and "the" include plural referents unless expressly and unequivocally limited to one referent.

Whereas particular embodiments of this invention have been described above for purposes of illustration, it will be evident to those skilled in the art that numerous variations of the details of the present invention may be made without departing from the invention.

What is claimed is:

1. A valve seat installation tool comprising:
   a force conversion shaft extending from a shaft front surface to a shaft rear surface along a central axis;
   a torque nut fixedly secured to the force conversion shaft adjacent to the shaft front surface structured and arranged to transfer rotational force to the force conversion shaft; and
   a pump adapter secured to the force conversion shaft between the torque nut and the shaft rear surface.

2. The valve seat installation tool of claim 1, wherein the torque nut is welded to the force conversion shaft.

3. The valve seat installation tool of claim 1, wherein the force conversion shaft comprises a shaft set of threads extending along at least a portion of an outside surface of the shaft in an axial direction parallel to the central axis.

4. The valve seat installation tool of claim 3, wherein the pump adapter comprises a pump adapter inner surface defined by a pump adapter hole extending along the central axis;
   wherein a pump adapter set of inner threads extends along at least a portion of the pump adapter inner surface in an axial direction parallel to the central axis, the pump adapter set of inner threads being structured and arranged to form a threaded connection with the shaft set of threads.

5. The valve seat installation tool of claim 4, wherein the threaded connection is structured and arranged to move the pump adapter along the force conversion shaft in the axial direction along the central axis in response to the rotation of the force conversion shaft.

6. The valve seat installation tool of claim 1, wherein the pump adapter is releasably secured to the force conversion shaft.

7. The valve seat installation tool of claim 1, wherein the shaft rear surface is in contact with a head.

8. The valve seat installation tool of claim 7, wherein the head is inserted into a valve seat of a pump body.

9. A method of installing a valve seat with a valve seat installation tool recited in claim 1 comprising:
   inserting the valve seat into a pump body;
   inserting a head into the valve seat;
   securing a pump adapter of claim 1 to a pump opening of the pump body;
   securing a force conversion shaft of claim 1 to the pump adapter, wherein the force conversion shaft extends from the shaft front surface to the shaft rear surface along the central axis and the pump adapter is secured between the shaft front surface and the shaft rear surface;

inserting the force conversion shaft into the pump body such that the force conversion shaft moves along the central axis relative to the pump adapter until the shaft rear surface comes in contact with the head;

attaching a socket of a torque wrench to the torque nut secured to the force conversion shaft adjacent to the shaft front surface; and rotating in a first direction the torque nut with the socket.

10. The method of claim 9, wherein the torque nut is welded to the force conversion shaft.

11. The method of claim 9, wherein the force conversion shaft comprises a shaft set of threads extending along at least a portion of an outside surface of the shaft in an axial direction parallel to the central axis.

12. The method of claim 11, wherein the pump adapter comprises a pump adapter inner surface defined by the pump adapter hole extending along the central axis;

wherein a pump adapter set of inner threads extends along at least a portion of a pump adapter inner surface in an axial direction parallel to the central axis, the pump adapter set of inner threads being structured and arranged to form a threaded connection with the shaft set of threads.

13. The method of claim 12, wherein the threaded connection is structured and arranged to move the pump adapter along the force conversion shaft in the axial direction along the central axis in response to rotation of the force conversion shaft.

14. The method of claim 9, wherein the pump adapter is releasably secured to the force conversion shaft.

15. The method of claim 9, wherein the head extends from a rear end to a front end, the rear end being in contact with the valve seat and the front end comprising a head recess structured and arranged to receive the shaft rear surface.

16. The method of claim 9, wherein the torque nut is rotated until a predetermined torque value is measured.

17. The method of claim 16, wherein the predetermined torque value is based on a property of the valve seat.

18. The method of claim 9, wherein the pump adapter is secured relative to the force conversion shaft by a threaded connection between a pump adapter set of outer threads and the pump opening of the pump body, the pump adapter set of outer threads extending along at least a portion of a pump adapter outer surface in an axial direction parallel to the central axis.

19. The method of claim 9, wherein the torque wrench comprises at least one torque multiplier.

20. The method of claim 9, wherein rotation in the first direction of the force conversion shaft moves the force conversion shaft in an axial direction relative to the pump adapter along the central axis toward the valve seat.

* * * * *